Nov. 28, 1967  E. O. ORREVAD  3,354,507
INJECTION MOULDING NOZZLES FOR PLASTICS
Filed May 26, 1965
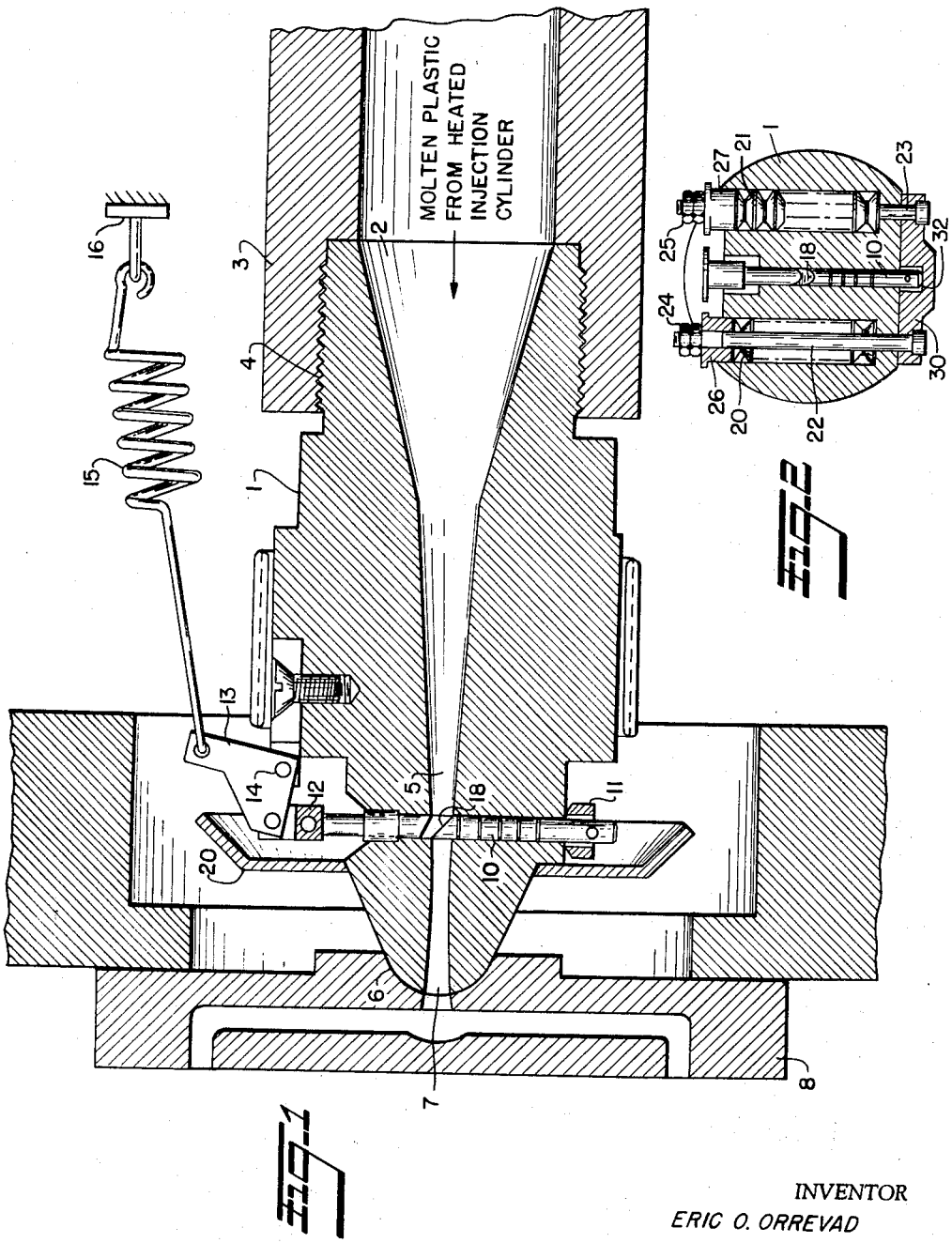
INVENTOR
ERIC O. ORREVAD
Strauch, Nolan, Neale,
Nies and Bronaugh
ATTORNEYS ID
3,354,507
INJECTION MOULDING NOZZLES FOR PLASTICS
Eric Osten Orrevad, Ringarstigen 3, Bromma, Sweden
Filed May 26, 1965, Ser. No. 459,061
4 Claims. (Cl. 18—30)

ABSTRACT OF THE DISCLOSURE

An injection nozzle having a plastic flow channel that is concentrically aligned with the axis of the injection cylinder contains a valve movable substantially at right angles to the plastic flow channel. The valve is normally spring biased to a closed position and has a closure surface which is angularly related, preferably at an angle of approximately 45 degrees, to the direction of movement of both the valve and of the plastic flow through the channel. Pressure on the plastic from the injection cylinder is used to provide force on the valve to open the valve against the biasing forces. When the pressure from the injection ceases, i.e., between injection cycles, the plastic flow channel is closed by the biasing force applied to the valve. The valve is opened automatically when the pressure from the injection cylinder is reestablished.

---

This invention relates to the injection moulding of plastic, and more specifically to a nozzle body which is connected to the injection cylinder and has a nose portion which is adapted for use with interchangeable tools or mould parts. The primary novel feature of the present invention resides in the provision of a novel valve movable substantially at right angles to the plastic flow channel and the manner by which this valve is actuated in response to the pressure of the molten plastic from the heated injection cylinder.

In the prior art constructions of which I am aware, the closure system for the nozzle injection aperture comprised valve cones of various types disposed in axial alignment with the injection aperture at the nose portion of the nozzle. The channel for the passage of the injection moulding compound has therefore necessarily been disposed eccentrically with respect to the injection aperture. With such an arrangement of the channel, it is inevitable that relatively abrupt changes of direction occur during the passage of the molten compound through the nozzle.

With corners and angles provided in the nozzle body, the compound passes slowly or accumulates at certain areas with the result that scorching occurs and the material is discolored. To avoid these disadvantages, it is necessary that the plastic compound must pass through the nozzle at a relatively uniform and high velocity if the injection moulding materials being used are sensitive in this respect.

A major object of the present invention resides in providing a nozzle having a plastic flow channel that does not contain such corners or angles and which is therefore in the form of a straight passage disposed in continuation of the injection cylinder aperture.

A further object of the invention is to provide a novel injection nozzle which has a plastic flow channel that is concentrically aligned with the axis of the injection cylinder and which contains a novel valve movable substantially at right angles to the plastic flow channel.

Still another object of the invention resides in providing a plastics injection nozzle having a novel valve arrangement which is normally biased by an external force such as a spring to a valve closed position and which has a closure surface which is angularly related to the direction of movement of both the valve and of the plastic flow through the channel whereby pressure on the plastic from the injection cylinder is used to provide a force on the valve to open the valve against the biasing force applied externally to the valve. With such an arrangement, when the pressure from the injection cylinder ceases, i.e. between injection cycles, the plastic flow channel is closed by the external force applied to the valve. The valve, however, is opened automatically when the pressure from the injection cylinder is re-established.

These and other objects of the invention will become more fully apparent from the claims, and from the description as it proceeds in connection with the appended drawings wherein:

FIGURE 1 is a vertical view in section of the injection nozzle of the present invention shown attached to the outlet of the injection cylinder and with the nose portion in place against a mould part; and FIGURE 2 is an end elevation in section looking in the direction from the injection cylinder toward the nose end portion of the nozzle, but a different form of spring is shown for normally biasing the valve member to its closed position.

The injection nozzle comprises a generally elongated body 1 having a generally cylindrical external surface and a central plastic flow channel 2 which has its maximum diameter at the end where body 1 is connected to injection cylinder 3. Nozzle body 1 may be connected to injection cylinder 3 as by a screw threaded portion 4.

The plastic flow channel converges through a tapered section to a region 5 having a comparatively small diameter and then to the nose portion end 6 of the nozzle body where the channel opens at 7 to transport the molten plastic into a mould or tool 8.

According to the invention, the channel 2 through nozzle body 1 can be closed by a valve at region 5 whose longitudinal axis lies in a plane that is substantially perpendicular to the direction of plastic flow through channel 2.

The valve may be in the form generally of an elongated rod 10 having a generally cylindrical outer surface. Nozzle body 1 may be drilled to provide a through bore that intersects plastic flow channel 5. Rod 10 is adapted to be slidably mounted in the bore and the fit sufficiently close as to prevent leakage along the stem of the valve. At the lower end of rod 10, suitable means such as nut 11 may be provided to limit upward movement of rod 10 to that position as is illustrated in the drawing.

The upper end of valve 10 may be provided with a yoke 12 which is connected to one leg of a bell crank 13. Crank 13 is suitably mounted on nozzle body 1 for pivotal movement about pin 14. The other leg of bell crank 13 is connected to spring 15 which has one end fixed as diagrammatically illustrated at 16. The connection of spring 15 to the support 16 in practice may be made adjustable in any convenient manner to vary the tension supplied to valve 10 by spring 15.

The valve closure surface 19 is angularly related to both the direction of plastic flow through channel 2 and the longitudinal axis of valve 10 so that the pressure of the molten plastic from injection cylinder 3 acting on surface 18 will produce a force tending to move valve 10 downwardly. Preferably closure surface 18 is arranged so that it forms an angle of about 45° with both the direction of plastic flow and the longitudinal axis of valve 10, and the end plane of the closure surface is directed towards the injection cylinder 2.

At the beginning of an operating cycle, valve 10 is held by the actuator system in the illustrated position whereby the plastic flow channel 2 is closed. When the moulding compound is pressed into channel 2 with sufficient pressure from injection cylinder 3, valve 10 is actuated to open against the closure force provided by spring 15, whereupon the moulding compound can pass through aperture 7 so long as the pressure is maintained. As the pressure of the moulding compound decreases, as when the mould or tool 8 is full, the closure force provided by spring 15 predominates so that the valve closes the plastic flow channel 2.

The arrangement of valve closure surface 18, i.e., its direction in relation to the longitudinal axis of the valve, serves two purposes: firstly, the moulding compound can exert pressure on the valve such that a valve opening force is provided, and secondly the valve cuts off the strand of the plastic compound on closing without any difficulty.

If for some reason the tool does not bear tightly against the nozzle nose portion 6 so that the compound flows uncontrollably, a shield 20 is provided on valve body 1 to prevent the valve and its actuator system and the transmission elements (not shown) from being blocked. Shield 20 may be shaped in any suitable manner to protect the valve.

Referring now to FIGURE 2, an alternative spring arrangement is illustrated for normally biasing valve 10 to its closing position. In this embodiment body 1 is provided with two large bores on opposite sides of the bore for valve 10, into which helical springs 20 and 21 are positioned. Bolts 22 and 23 extend through the center of springs 20 and 21 respectively, and have nuts 24 and 25 which hold spring retainer bushings 26 and 27 in place. Bushings 26 and 27 are slidable from the position illustrated downwardly into the bores in body 1 for a limited distance.

At the lower side of body 1, an abutment member 30 is provided which has two through bores for receiving the shanks of bolts 22 and 23 and a central recess 32 to receive the lower end of valve member 10. The force of the molten plastic under pressure on surface 18 causes valve 10 to move downwarly and push abutment member 30 away from body 1. Displacement of abutment member 30 downwardly causes bushings 26 and 27 to compress springs 20 and 21. The tension of the springs can be varied by the adjustment of nuts 24 and 25.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A plastics injection nozzle for use between an injection cylinder and a normally interchangeable tool comprising an elongated body having one end joined to the injection cylinder and a nose portion at the opposite end for engagement with said interchangeable tool, a plastic flow channel extending from a first comparatively large aperture at the injection cylinder end and a second smaller aperture at the nose portion, said channel having walls which taper gradually from said comparatively large aperture to said comparatively smaller aperture; a valve member mounted in said body for sliding movement in a plane perpendicular to the direction of plastic flow through said cavity, said valve member having a generally cylindrical shape and being of a size sufficient to completely close said cavity at a location intermediate said two apertures and being formed with an opening which communicates with said channel when the valve is in its open position, said valve member opening containing a valve closure surface disposed at approximately 45° relative to both the direction of movement of the valve member and the direction of flow of said plastic through the channel at the position where said valve member is located, said valve closure surface providing a force to move said valve member to its open position when pressure in said injection cylinder is above a predetermined value; and means located externally of said plastic flow channel and connected to said valve member for providing a force in opposition to the force provided by the pressure acting on said valve closure surface for normally biasing said valve closure surface to its closing position comprising a spring member having one end fixed, and an intermediate member mounted for movement relative to said nozzle body and having one portion connected to said spring member and a second portion connected to said valve member.

2. A plastics injection nozzle for use between an injection cylinder and a normally interchangeable tool comprising an elongated body having a threaded portion at one end for connection to the injection cylinder and a nose portion at the opposite end for engagement with said interchangeable tool, a plastic flow channel extending from a first comparatively large aperture at the injection cylinder end and a second smaller aperture at the nose portion, said channel having walls which taper gradually from said comparatively large aperture to said comparatively smaller aperture; a valve member mounted in said body for sliding movement in a plane perpendicular to the direction of plastic flow through said cavity, said valve member having a generally cylindrical shape and having a size sufficient to completely close said channel at a location intermediate said two apertures and being formed with a through opening which is aligned with said channel when the valve is in its open position, said valve member opening containing a valve closure surface disposed at approximately 45° relative to both the direction of movement of the valve member and the direction of flow of said plastic through the channel at the position where said valve member is located, said valve closure surface providing a force to move said valve member to its open position when pressure in said injection cylinder is above a predetermined value; means located externally of said plastic flow channel and connected to said valve member for providing a force in opposition to the force provided by the pressure acting on said valve closure surface for normally biasing said valve closure surface to its closing position comprising a pair of helical spring members having one end fixed, and a bell crank member mounted for pivotal movement on said nozzle body and having one leg connected to said spring member and a second leg connected to said valve member; and a shield disposed between said bell crank and the nose portion end of said nozzle body adapted for connection to said tool for preventing flow of molten plastic from said second aperture onto said bell crank and valve member.

3. A plastics injection nozzle for use between an injection cylinder and a normally interchangeable tool comprising an elongated body having a threaded portion at one end for connection to the injection cylinder and a nose portion at the opposite end for engagement with said interchangeable tool, a plastic flow channel extending from a first comparatively large aperture at the injection cylinder end and a second smaller aperture at the nose portion, said channel having walls which taper gradually from said comparatively large aperture to said comparatively smaller aperture; a valve member mounted in said body for sliding movement in a plane perpendicular to the direction of plastic flow through said cavity, said valve member having a generally cylindrical shape and having a size sufficient to completely close said channel at a location intermediate said two apertures and being formed with a through opening which is aligned with said channel when the valve is in its open position, said valve member opening containing a valve closure surface disposed at approximately 45° relative to both the direction of movement of the valve member and the direction of flow of said plastic through the channel at the position where said valve member is located, said valve closure surface providing a force to move said valve member to its open position when pressure in said injection cylinder is above a predetermined value; means located externally of said plastic flow channel and connected to said valve member for providing a force in opposition to the force provided by the pressure acting on said valve closure surface for normally biasing said valve closure surface to its closing position comprising a pair of helical spring members having one end fixed, a tension member extending through each spring member, and an abutment member joined to both of said tension members and contacting said valve body so as to provide the closing force on said valve member; and a shield disposed between said abutment member and the nose portion end of said nozzle body adapted for connection to said tool for preventing flow of molten plastic from said second aperture onto said abutment member.

4. In injection moulding apparatus, the combination of an injection cylinder, a mould part, and an injection nozzle mounted at one end on said injection cylinder and having a nose portion that fits against the mould part, said nozzle comprising an elongated body having a threaded portion at one end for connection to the injection cylinder and a nose portion at the opposite end for engagement with said interchangeable tool, a plastic flow channel extending from a first comparatively large aperture at the injection cylinder end and a second smaller aperture at the nose portion, said channel having walls which taper gradually from said comparatively large aperture to said comparatively smaller aperture; a valve member mounted in said body for sliding movement in a plane perpendicular to the direction of plastic flow through said cavity, said valve member having a generally cylindrical shape and having a size sufficient to completely close said channel at a location intermediate said two apertures and being formed with a through opening which is aligned with said channel when the valve is in its open position, said valve member opening containing a valve closure surface disposed at approximately 45° relative to both the direction of movement of the valve member and the direction of flow of said plastic through the channel at the position where said valve member is located, said valve closure surface providing a force to move said valve member to its open position when pressure in said injection cylinder is above a predetermined value; means located externally of said flow channel and connected to said valve member for providing a force in opposition to the force provided by the pressure acting on said valve closure surface for normally biasing said valve closure surface to its closing position comprising a spring member having one end fixed relative to said nozzle body, and a member mounted for movement relative to said nozzle body and having one part connected to said spring member and a second part positioned to move with said valve member; and a shield disposed between said injection cylinder and the nose portion end of said nozzle body adapted for connection to said tool for preventing flow of molten plastic from said second aperture onto said biasing force means.

References Cited
UNITED STATES PATENTS

| | | | |
|---|---|---|---|
| 3,014,241 | 12/1961 | Hehl | 18—30 |
| 3,226,768 | 1/1966 | Von Zelewsky et al. | 18—30 |

FOREIGN PATENTS

| | | |
|---|---|---|
| 1,104,684 | 4/1961 | Germany. |
| 195,047 | 6/1964 | Switzerland. |

WILBUR L. McBAY, *Primary Examiner.*